(12) United States Patent
Delker et al.

(10) Patent No.: US 7,580,725 B2
(45) Date of Patent: Aug. 25, 2009

(54) INTELLIGENT WIRELESS DEVICE MODE CHANGING DEVICE AND METHOD

(75) Inventors: Ryan P. Delker, Chandler, AZ (US); Joseph Patino, Pembroke Pines, FL (US)

(73) Assignee: Motorola, Inc., Schaumburg, IL (US)

( * ) Notice: Subject to any disclaimer, the term of this patent is extended or adjusted under 35 U.S.C. 154(b) by 583 days.

(21) Appl. No.: 10/872,311

(22) Filed: Jun. 18, 2004

(65) Prior Publication Data

US 2005/0282576 A1    Dec. 22, 2005

(51) Int. Cl.
*H04B 1/38* (2006.01)
(52) U.S. Cl. ............ 455/550.1; 455/418; 455/566
(58) Field of Classification Search ......... 455/550.1, 455/556, 418, 419, 553.1, 556.1, 90.1–90.3, 455/345, 346, 347, 349; 340/426, 455, 565, 340/568, 571; 307/10.2; 367/93; 381/86
See application file for complete search history.

(56) References Cited

U.S. PATENT DOCUMENTS

| | | | |
|---|---|---|---|
| 4,290,126 A * | 9/1981 | McFadyen et al. | 367/93 |
| 5,705,975 A * | 1/1998 | Serino et al. | 455/346 |
| 5,732,144 A | 3/1998 | Patino et al. | |
| 6,643,528 B1 | 11/2003 | Shim et al. | |
| 6,674,358 B1 | 1/2004 | Tinsley | |
| 6,765,486 B2 * | 7/2004 | Roberts | 455/569.1 |
| 6,965,787 B2 * | 11/2005 | Kindo et al. | 455/569.2 |
| 2004/0214598 A1 * | 10/2004 | Parameswaran Rajamma | 455/556.1 |

OTHER PUBLICATIONS

U.S. Appl. No. 10/388,774, filed Mar. 14, 2003, Vogel et al.

* cited by examiner

*Primary Examiner*—Sam Bhattacharya (57) ABSTRACT

A device, method and computer readable medium for configuring settings of a device, such as a wireless device (400), based upon detection of nearby surfaces. The device includes a detection signal generator (330, 334, 338) and a detection signal receiver (332, 336). Detection signals include light generated by a display backlight (334) or a keypad (338) that is detected by a camera (336) or other photo-detector. Further detection signals include non-audible frequency sound signals generated by a speaker (330) and that are detected by a microphone (332). The device includes a processor (320) that configures settings in response to the detection of a nearby surface, such as a portion (520, 522) of a holster (500). The settings of the device, such as the wireless device (400), include at least one of a ring setting, a battery setting, a keypad 338 setting, and a display 334 setting.

21 Claims, 7 Drawing Sheets

FIG. 10

INTELLIGENT WIRELESS DEVICE MODE CHANGING DEVICE AND METHOD

FIELD OF THE INVENTION

The present invention generally relates to the field of wireless communication systems, and more particularly relates to the automatic changing of configuration settings.

BACKGROUND OF THE INVENTION

Wireless devices, such as cellular phones and the like, are frequently operated by battery power and are small enough to be easily carried along by a user of the wireless device. The small size of these devices places battery capacity at a premium and techniques to reduce battery consumption greatly increase the usable time for these wireless devices. Various operating modes for wireless devices affect power consumption, such as ringer mode, backlight operation, and so forth. Automatic detection of conditions that allow the operating mode of a wireless device to be changed to reduce power consumption without adversely affecting the usability of the wireless device can be used to extend battery life in such wireless devices.

One condition under which wireless devices can be placed into a lower power consumption mode is when the wireless device is placed into a holster. Wireless devices frequently include a holster that is adapted to the case of the wireless device and allows a user to store the wireless device in the holster when the wireless device is not in use. Automatic detection of placing the wireless device in the holster and alteration of the wireless device's operating mode when in the holster is one means for automatically reducing power consumption. Prior art techniques of sensing placement of the wireless device into the holster include placing electronic contact features or a magnet in the holster and providing sensing equipment in the wireless device to detect these features or magnet when the wireless device is placed in the holster. This requires specialized construction of the holster and of the wireless device, reducing design flexibility for those devices. Additional parts in the holster and in the wireless device, such as the electronic contact features, magnet, and special sensors, are needed for such a prior art application, regrettably adding significant costs and manufacturing and maintenance complexities to any such solution.

SUMMARY OF THE INVENTION

Briefly, in accordance with the present invention, a wireless device includes a detection signal generator that generates a signal to be emitted from the wireless device. The wireless device further contains a detection signal receiver that is located on the wireless device and oriented to receive the detection signal if the detection signal is reflected from a nearby structure, such as a reflective surface, and does not receive the detection signal if the detection signal is not reflected from the nearby structure, such as a reflective surface. A device controller coupled with the detection signal receiver determines reception of the reflected detection signal. The device controller alters at least one operational mode of the wireless device in response to detection of receiving the detection signal being reflected from the nearby structure, such as a reflective surface.

In accordance with another aspect of the present invention, a method automatically configures settings of a wireless device by emitting a detection signal from the wireless device and detecting reception of the detection signal with a detection signal receiver that is located in the wireless device and oriented to receive the detection signal if the detection signal is reflected from a nearby structure, such as a reflective surface, and to not receive the detection signal if the detection signal is not reflected from a nearby structure, such as a reflective surface. The method further includes altering at least one operational mode of the wireless device in response to receiving the detection signal being reflected from the nearby structure, such as a reflective surface.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The present invention, according to a preferred embodiment, advantageously overcomes problems with the prior art by providing a system, method and computer program product for adjusting configuration settings of a wireless device, as will be discussed in detail below.

I. Overview

Figure 1:
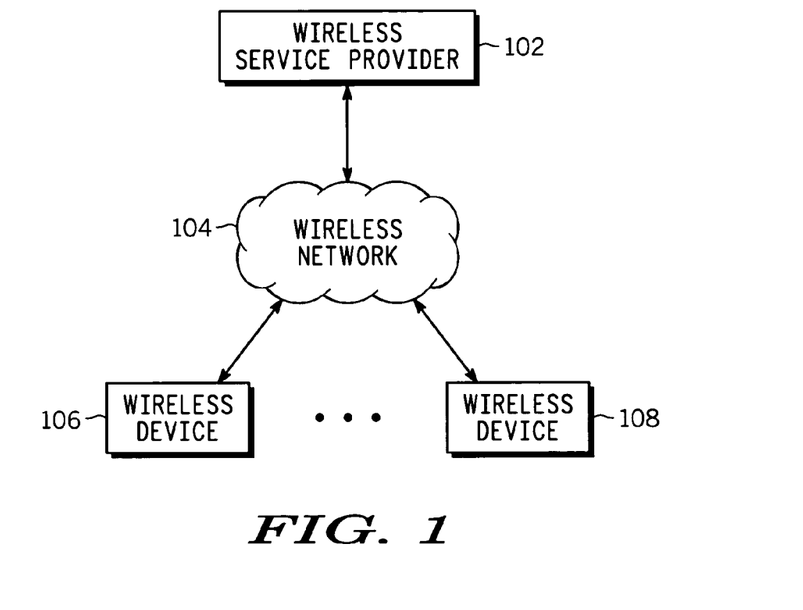
FIG. 1 is a block diagram illustrating a conventional wireless communication system.

FIG. 1 is a block diagram illustrating a conventional wireless communication system. FIG. 1 shows a wireless service provider 102 operating on a wireless network 104, which connects the wireless service provider 102 with wireless devices 106 and 108. The wireless service provider 102 is a first-generation analog mobile phone service, a second-generation digital mobile phone service or a third-generation Internet-capable mobile phone service. The wireless network 104 is a mobile phone network, a mobile text messaging device network, or the like. Further, the communications standard of the wireless network 104 of FIG. 1 is Code Division Multiple Access (CDMA), Time Division Multiple Access (TDMA), Global System for Mobile Communications (GSM), General Packet Radio Service (GPRS), Frequency Division Multiple Access (FDMA) or the like. Alternatively, the communications standard of the wireless network 104 of FIG. 1 comprises a short range communications system such as Bluetooth, Infrared Data Association (IrDA) or the like.

The wireless network 104 supports any number of wireless devices 106 through 108, which can include any combination of the following: two-way radios, mobile telephone phones, smart phones, cellular phones, text messaging devices, two-way messaging devices, handheld computers, messaging devices, beepers, or the like. A smart phone is a combination of 1) a pocket PC, handheld PC, palm top PC, or Personal Digital Assistant (PDA) and 2) a mobile telephone. Examples of wireless devices 106 through 108 will be described in further detail below.

Figure 2:
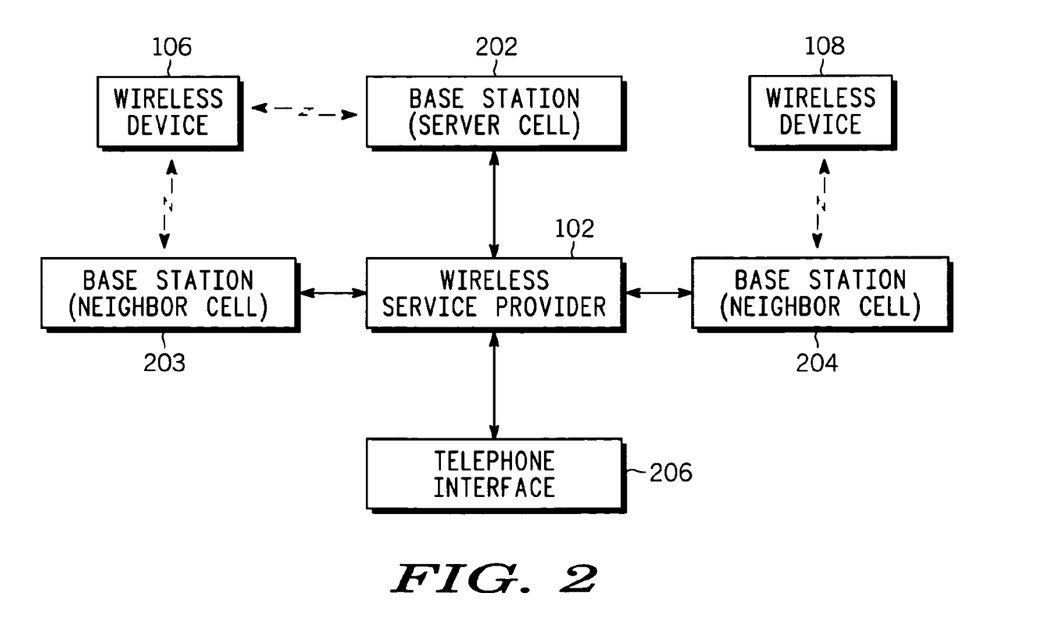
FIG. 2 is a more detailed block diagram of a conventional wireless communication system.

FIG. 2 is a more detailed block diagram of the wireless communication system described with reference to FIG. 1 above. The wireless communication system of FIG. 2 includes the wireless service provider 102 coupled to base stations 202, 203, and 204, which represent the wireless network 104 of FIG. 1. The base stations 202, 203, and 204 individually support portions of a geographic coverage area containing subscriber units or transceivers (i.e., wireless devices) 106 and 108 (see FIG. 1). The wireless devices 106 and 108 interface with the base stations 202, 203, and 204 using a communication protocol, such as CDMA, FDMA, CDMA, GPRS and GSM. The wireless service provider 102 is interfaced to an external network (such as the Public Switched Telephone Network) through a telephone interface 206.

The geographic coverage area of the wireless communication system of FIG. 2 is divided into regions or cells, which are individually serviced by the base stations 202, 203, and 204 (also referred to herein as cell servers). A wireless device operating within the wireless communication system selects a particular cell server as its primary interface for receive and transmit operations within the system. For example, wireless device 106 has cell server 202 as its primary cell server, and wireless device 108 has cell server 204 as its primary cell server. Preferably, a wireless device selects a cell server that provides the best communication interface into the wireless communication system. Ordinarily, this will depend on the signal quality of communication signals between a wireless device and a particular cell server.

As a wireless device moves between various geographic locations in the coverage area, a hand-off or hand-over may be necessary to another cell server, which will then function as the primary cell server. A wireless device monitors communication signals from base stations servicing neighboring cells to determine the most appropriate new server for hand-off purposes. Besides monitoring the quality of a transmitted signal from a neighboring cell server, the wireless device also monitors the transmitted color code information associated with the transmitted signal to quickly identify which neighbor cell server is the source of the transmitted signal.

Figure 3:
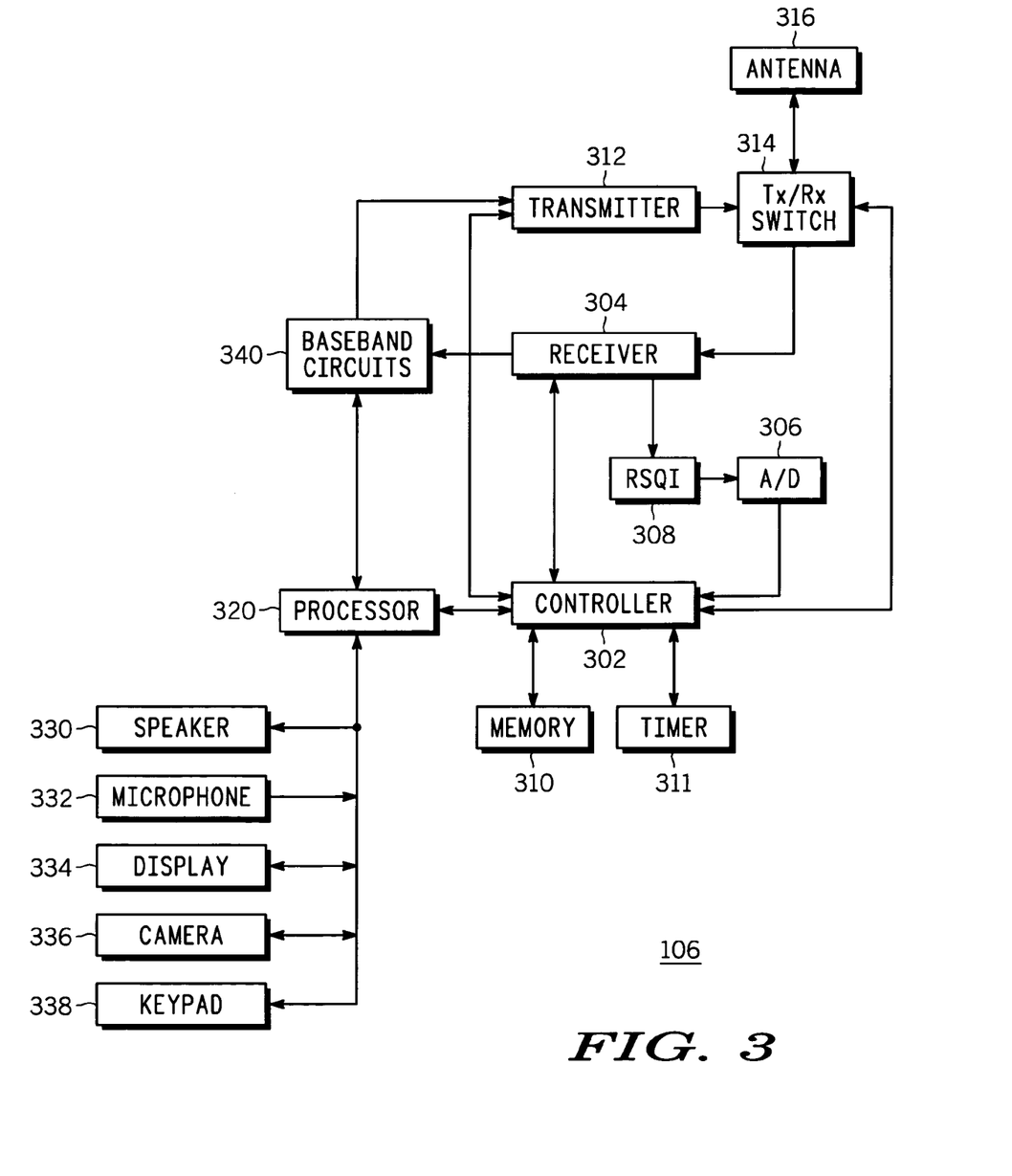
FIG. 3 is a block diagram illustrating a wireless device for a wireless communication system according to an exemplary embodiment of the present invention.

FIG. 3 is a more detailed block diagram of a wireless device 106 described with reference to FIGS. 1 and 2 above. FIG. 3 shows a wireless device 106, such as shown in FIG. 1. In one embodiment of the present invention, the wireless device 106 is a two-way radio capable of receiving and transmitting radio frequency signals over a communication channel under a communications protocol such as CDMA, FDMA, GPRS or GSM. The wireless device 106 operates under the control of a controller 302 which switches the wireless device 106 between receive and transmit modes. In receive mode, the controller 302 couples an antenna 316 through a transmit/receive switch 314 to a receiver 304. The receiver 304 decodes the received signals and provides those decoded signals to the controller 302. In transmit mode, the controller 302 couples the antenna 316, through the switch 314, to a transmitter 312.

The controller 302 operates the transmitter and receiver according to instructions stored in memory 310. The stored instructions include a neighbor cell measurement scheduling algorithm. Memory 310 is Flash memory, other non-volatile memory, random access memory (RAM), dynamic random access memory (DRAM) or the like. A timer module 311 provides timing information to the controller 302 to keep track of timed events. Further, the controller 302 can utilize the time information from the timer module 311 to keep track of scheduling for neighbor cell server transmissions and transmitted color code information.

When a neighbor cell measurement is scheduled, the receiver 304, under the control of the controller 302, monitors neighbor cell servers and receives a "received signal quality indicator" (RSQI). RSQI circuit 308 generates RSQI signals representing the signal quality of the signals transmitted by each monitored cell server. Each RSQI signal is converted to digital information by an analog-to-digital converter 306 and provided as input to the controller 302. Using the color code information and the associated received signal quality indicator, the wireless device 106 determines the most appropriate neighbor cell server to use as a primary cell server when hand-off is necessary.

The exemplary wireless device shown in FIG. 3 includes baseband circuits 340 that process data, audio, image, and video data as communicated with user interface devices, such as a speaker 330, a display 334, a camera 336, keypads 338, and other such user interface devices, such as buttons, touchpads, joysticks, and other interface circuits, in a manner well known to those of ordinary skill in the art. The baseband circuits 340 process such user interface data in order to interface information with the transmitter 312 and receiver 304 for wireless communications.

The processor 320 (also referred to as the controller 320) in FIG. 3 performs various functions such as the functions attributed to configuration setting adjustment, described in greater detail below. In various embodiments of the present invention, the processor 320 in FIG. 3 is a single processor or more than one processor for performing the tasks described herein.

Processor 320 in the exemplary embodiment controls several human-machine interface components within wireless device 106. Wireless device 106 includes human-machine interface devices such as a speaker 330, microphone 332, display 334, camera 336 and keypad 338, as are described in more detail below. Display 334 and keypad 338 of the exemplary embodiment include Light Emitting Diode (LED) backlights that facilitate reading images on the display 334 or keypad 338, in a manner well known by those of ordinary skill in the relevant arts. The processor 320, according to the exemplary embodiment, also controls these human-machine interface devices, including backlights for the display 334 and keypad 338, in the course of performing certain specialized processing associated with determining if a nearby surface is in proximity to the wireless device 106, as will be more fully described below.

In an embodiment of the present invention, the wireless device 106 comprises a smart phone, which is a combination of 1) a pocket PC, handheld PC, palm top PC, or Personal Digital Assistant (PDA) and 2) a mobile telephone. In this embodiment, the wireless device 106 includes more than one processor 320—including a baseband processor and an application processor. The baseband processor handles those processes associated with the call setup and call maintenance processes of the wireless device 106. The application processor handles those processes associated with the execution of application programs on the PC portion of the wireless device 106. The baseband processor and the application processor have access to the memory module 310, which is used for storing and retrieving data and instructions necessary for performing the functions of wireless device 106.

II. Wireless Device Hardware

A. The Wireless Device

Figure 4:
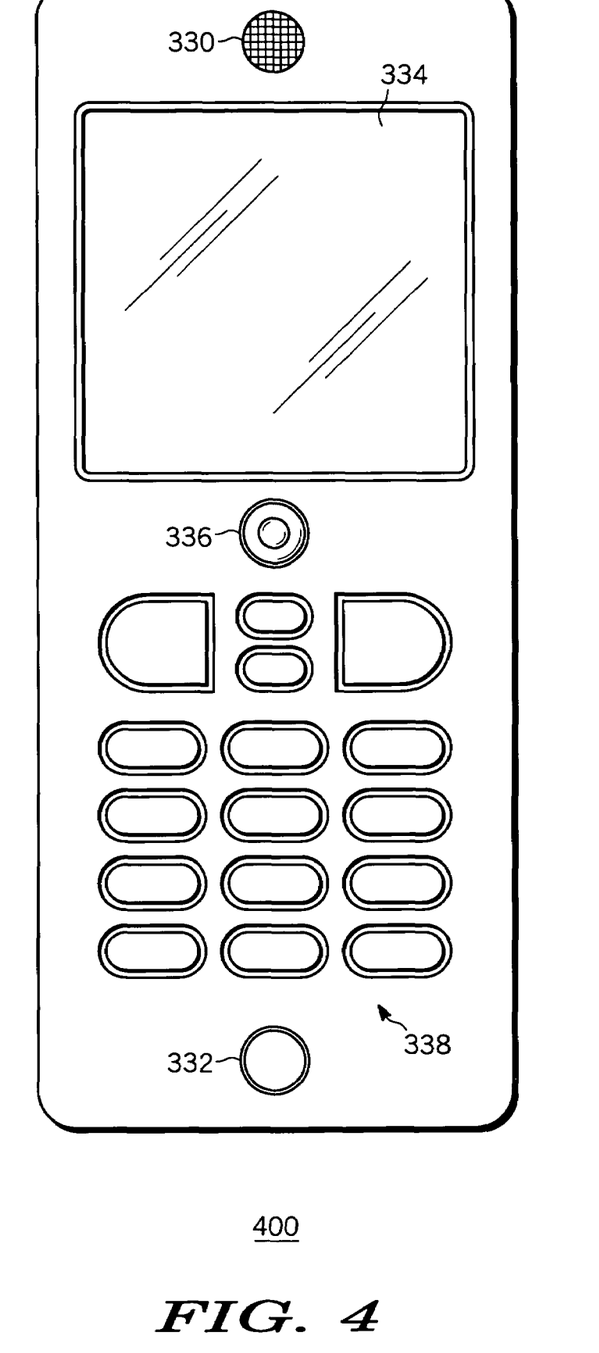
FIG. 4 is an illustration of a front view of an exemplary wireless device according to an exemplary embodiment of the present invention.

FIG. 4 is an illustration of a front view of an exemplary wireless device 400. According to an embodiment of the present invention, the wireless device 106 comprises an exemplary wireless device 400 as shown in FIG. 4. The exemplary wireless device 400 encompasses the conventional functions of a cellular telephone, including initiating and receiving telephone calls, voice mail, contact information storage, call data storage and initiating and receiving text communications. In another alternative embodiment, the exemplary wireless device 400 encompasses the conventional functions of a smart phone. A smart phone includes a combination of 1) a pocket PC, handheld PC, palm top PC, or PDA and 2) a mobile telephone.

The exemplary wireless device 400 operates to detect when the wireless device 400 is in proximity to a nearby surface. The exemplary wireless device 400, under control of the processor 320, activates a detection signal generator to emit a detection signal and monitors a detection signal receiver to determine if the emitted detection signal is being reflected back to the exemplary wireless device 400 with sufficient strength to indicate that a surface is nearby. If the signal is being reflected and received with sufficient magnitude, the processing of the wireless device 400 assumes that a nearby surface is in proximity to the wireless device 400. The wireless device 400 can be configured to alter one or more operating modes in response to detection of such a nearby surface by receiving the detection signal that is reflected from that nearby surface. For example, wireless device 400 can assume that it is in a holster or placed on a table when a nearby surface is detected, and settings for the ringer, display and/or keypad lighting, keypad 338 enable and other elements and/or functions can be suitably adjusted, as is described below.

The exemplary wireless device 400 includes a Liquid Crystal Display (LCD) user display 334, a cellular telephone keypad 338, a microphone 332 and a speaker 330. Microphone 332 and speaker 330 of the exemplary embodiment support conventional voice communications via the exemplary wireless device 400. The speaker 330 of the exemplary embodiment is further used as part of a detection signal generator, which is a non-audible sound signal generator, to periodically emit a sound signal that comprises a detection signal and that in the present exemplary embodiment comprises a non-audible frequency sound signal. In the exemplary embodiment, the non-audible detection signal comprises a non-audible frequency sound signal with a frequency (or a range of frequencies) that is in either or both of a sub-audible frequency band below about 10 Hz and an audio frequency band above about 30 KHz. Emission of the non-audible frequency sound signal, including the detection signal's frequency, amplitude and amplitude envelope, is controlled by the processor 320 in the exemplary embodiment. The amplitude envelope of the detection signal is able to include an on-off pulse pattern of sound signals. This on-off pulse pattern is further able to have a specific sequence of signal on-off time periods that can be used to identify the detection signal upon receipt.

Microphone 332 in this scenario, which is located in the exemplary wireless device 400, comprises a non-audible frequency sound receiver that is used as part of a detection signal receiver to receive the non-audible frequency sound signal emitted by the speaker 330 when that signal is reflected by a surface in proximity to the exemplary wireless device 400. The orientation of the microphone 332 is selected so as to have non-audible frequency sensitivity in the direction that the speaker 330 emits detection signals. This orientation facilitates reception of the detection signal when it is reflected by a nearby object. The microphone 332 is also located at a distance from the speaker 330 on the exemplary wireless device 400, thereby causing the microphone 332 to not receive the detection signal if it is not reflected from a nearby surface.

Detection of the non-audible frequency sound signal by the microphone 332, and the processing performed by processor 320, indicates that a surface is in proximity to the wireless device 400. Processor 320 processes the non-audible frequency sound signal received by microphone 332 to determine if the detection signal matches a predefined non-audible frequency (or frequencies), and a predefined pulse pattern, and a predefined amplitude envelope corresponding to the emitted detection signal, and if the overall amplitude of the received non-audible frequency sound signal is sufficient (e.g., meeting or exceeding a minimum threshold) to determine that it was reflected by a nearby surface. Identifying that the received non-audible frequency sound signal has the pulse pattern and amplitude envelope of the emitted detection signal is part of the processing of the exemplary embodiment that determines reception of the detection signal.

User display 334 displays such data as the time, call status, and automatic caller identification for incoming calls. The user display 334 of the exemplary embodiment includes a Light Emitting Diode (LED) backlight that is used to illuminate the user display 334 as well as act as a detection signal generator, as is described herein. The LED backlight of display 334 is controlled by processor 320 in the exemplary embodiment. Keypad 338 similarly has an LED backlight that is controlled by processor 320. In the course of performing nearby surface detection, the processor 320 periodically controls these LED backlights to operate as light generators that emit a light signal, optionally with a pre-defined or random pulsed pattern and/or amplitude envelope, that operates as an emitted detection signal.

The exemplary wireless device 400 further includes a digital camera 336. Digital camera 336 of the exemplary embodiment allows a user to capture images, such as by taking photographs or via a video capture device, using the wireless device 400 as is known to those of ordinary skill in the relevant arts. The digital camera 336 comprises also a specialized light receiver that is further used in this exemplary embodiment of the present invention as part of a detection signal receiver to detect light that is emitted by the backlight of user display 334 when that light is reflected by a nearby surface in proximity to the front of wireless device 400, as is described herein. Further embodiments of the present invention can utilize one or more light sensors, either individually or in any combination, as at least one light receiver, such as using photocells, phototransistors, and other sensors known to those of ordinary skill in the art.

Processor 320, in this example, controls the backlight of the display 334 (and of the keypad 338—see FIG. 4) to cause it to generate light that is periodically emitted in a defined pulse pattern with a defined amplitude envelope. Light captured by the digital camera 336 can also be processed by the processor 320 to determine if the intensity of the light meets or exceeds a pre-determined threshold which indicates that it was reflected by a nearby object, and if the received light pulse pattern and/or amplitude envelope matches a predefined light pulse pattern and/or amplitude envelope corresponding to the emitted light pattern and/or amplitude envelope that was emitted under control by the processor 320.

B. The Holster

A holster in this exemplary embodiment is a cradle or other support device for holding the exemplary wireless device 400 and for attaching to another body, such as the clothes of an individual. For example, a holster is a plastic cradle that holds the exemplary wireless device 400 and includes a belt clip for attaching to a belt or other object that is worn or carried by a user of the exemplary wireless device 400. Further embodiments include holsters of various designs, such as pouches, bags, pockets, and other designs.

Figure 5:
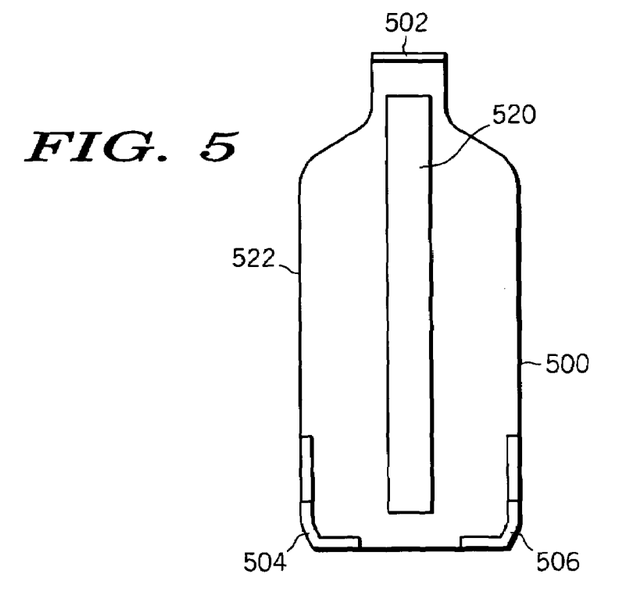
FIG. 5 is an illustration of a front view of a holster according to an exemplary embodiment of the present invention.

FIG. 5 is an illustration of a front side view of an exemplary holster 500. In an embodiment of the present invention, the holster 500 is a device manufactured from a pliable material such as plastic. FIG. 5 shows that the holster 500 includes a top hooked surface 502 at the top of the holster 500. The top hooked surface 502 curves around the top of the exemplary wireless device 400 when the wireless device 400 is placed in the holster 500, and it serves to hold the top of the exemplary wireless device 400 within the holster 500. FIG. 5 also shows that the holster 500 includes a left hooked surface 504 on the bottom left side of the holster 500 and a bottom hooked surface 506 on the bottom right side of the holster 500. The left hooked surface 504 curves around the bottom left side of the exemplary wireless device 400, when it is placed in the holster 500, and serves to hold the bottom left side of the exemplary wireless device 400 within the holster 500. The right hooked surface 506 curves around the bottom right side of the exemplary wireless device 400, when it is placed in the holster 500, and serves to hold the bottom right side of the exemplary wireless device 400 within the holster 500. The operation of the top hooked surface, left hooked surface 504 and right hooked surface 506 allows the holster 500 to accept attachment of the exemplary wireless device 400 to the holster.

Holster 500 further has a riser portion 522 that connects the top hooked surface 502, left hooked surface 504 and right hooked surface 506. The riser portion 522 extends for approximately the height of the exemplary wireless device 400. This causes the exemplary wireless device 400 to be attached to, and to snuggly fit into, the holster 500, as described below. The exemplary wireless device 400 is placed into the holster 500 so that its front side, which includes display 334, speaker 330, microphone 332 and camera 336, face the riser portion 522 of holder 500.

Holster 500 is further shown to include a reflective strip 520. Reflective strip 520 is an adhesive strip in the exemplary embodiment that is affixed to the riser portion 522 of the holster 500 in the exemplary embodiment. Reflective strip 520 is further constructed to reflect light emitted by, in this example, the backlight of the display 334 and/or the backlight for the keypad 338. The reflective strip 520 is designed to reflect the band of light emitted by the detection signal generator of the particular embodiment. Various embodiments of the present invention can utilize visible light, infrared light, and/or ultraviolet light as a detection signal.

The reflective strip 520 is positioned so that when the exemplary wireless device 400 is inserted into the holster 500, the emitted light detection signal, such as light emitted by the display 334 and/or the keypad 338, is reflected with sufficient intensity to the camera 336 in this example. The reflected light of sufficient light intensity (e.g., reflected light at least meeting a predetermined threshold of light intensity), comprises a detection signal in this exemplary embodiment. This allows the display 334 (and/or the keypad 338—see FIG. 4) to act as a detection signal generator that generates a detection light signal to be emitted from the exemplary wireless device 400. The camera 336 can act as a detection signal receiver that is located on the exemplary wireless device 400 and that is oriented to receive the light signal when the light signal is reflected from the reflective strip, which is a nearby surface. It is clear that when the exemplary wireless device 400 is removed from the holster 500, the light from the display 334 is not reflected to the camera 336 and the camera 336 does not receive light with sufficient intensity. In order to determine reception of the reflected light, the signal from the camera 336 is processed by processor 320 to determine, inter alia, that the intensity of the received light is meeting or exceeding a predetermined threshold. The predetermined threshold in the exemplary embodiment is selected so as to minimize "false triggers" by reflection from objects besides holster 500, but to detect light reflected by reflective strip 520 when the exemplary wireless device 400 is placed into the holster 500. Additionally, as has been discussed above, light captured by the digital camera 336 can also be processed by the processor 320 to determine if the received light pulse pattern and/or amplitude envelope matches a predefined light pulse pattern and/or amplitude envelope corresponding to the emitted light pattern and/or amplitude envelope that was emitted under control by the processor 320. These additional attributes of a detected light signal, according to the present example, comprise a detection signal in this exemplary embodiment.

Riser 522 further operates to reflect back to microphone 332 the non-audible sound signal that is generated by the speaker 330. This allows detection that the wireless device 400 is attached, and in proximity, to the holster 500 by detection of a detection signal, which may include any combination of detection of the reflected non-audible frequency sound signal and/or detection of the reflected light signal. Some embodiments of the present invention utilize both of the light signal and non-audible signals as detection signals. Further embodiments only use one of these signals. Yet further embodiments utilize other detection signals that are emitted by suitable detection signal generators and received by suitable detection signal receivers, as should be obvious to those of ordinary skill in the art in view of the present discussion.

Figure 6:
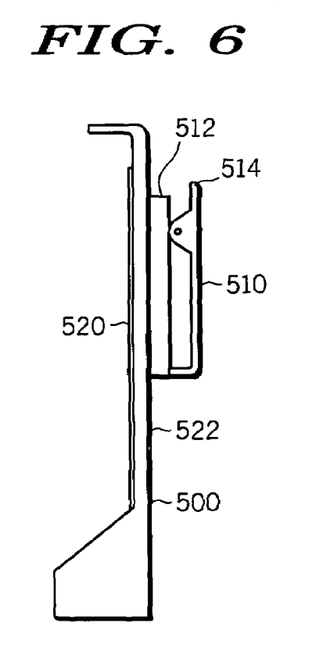
FIG. 6 is an illustration of a side view of a holster according to an exemplary embodiment of the present invention.

FIG. 6 is an illustration of a side view of the holster 500. FIG. 6 shows that the holster 500 includes a clip 510 for clipping the holster 500 to an object such as a belt, a pant end, or any other flat surface. The clip 510 is coupled to the holster 500 via a hinge that allows the clip 510 to be opened and closed for attachment purposes. A user typically applies pressure on a clip lever 514 that causes the clip 510 to rotate around the hinge. The hinge of the clip 510 couples the clip 510 to a clip element 512. The clip element 512 remains stationary while the clip 510 is allowed to rotate, e.g., to open and close. A spring element (not shown), located between and spring loading the clip 510 and the clip element 512, provides closing spring force to the clip 510 that tends to maintain the clip 510 in the closed position. A user can apply pressure on the clip lever 514 to move the clip 510 to an open position. Reflective strip 520 is further shown to be present on the riser portion 522 of the holster 500.

Figure 7:
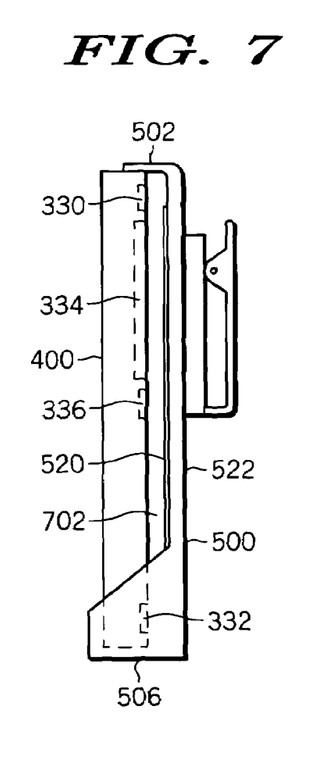
FIG. 7 is an illustration of a side view of an exemplary wireless device coupled with a holster.

FIG. 7 is an illustration of a side view of the exemplary wireless device 400 coupled with the holster 500. FIG. 7 shows that the exemplary wireless device 400 is placed within the holster 500 with the front side of the exemplary wireless device 400 facing the front face of the holster 500, including the reflective strip 520 on riser 522. In this arrangement, there is a gap 702 between the front side of the exemplary wireless device 400 and the riser portion 522 of the holster 500. This gap 702 allows a sound signal, for example the non-audible frequency signal, emitted by the speaker 330 to be reflected by riser portion 522 so as to be received by the microphone 332. The gap 702 also allows a light signal emitted by the display 334 (and/or the keypad 338—see FIG. 4) to be reflected by the reflective strip 520 affixed to the riser portion 522, which is a nearby surface, and to be received by the camera 336.

FIG. 7 also shows that the hooked surface 502 curves around the top of the exemplary wireless device 400 and serves to hold the top of the exemplary wireless device 400 within the holster 500. FIG. 7 also shows that the hooked surface 506 curves around the right side of the exemplary wireless device 400 and serves to hold the right side of the exemplary wireless device 400 within the holster 500. The other hooked surface 504 (not shown) curves around the left side of the exemplary wireless device 400 and serves to hold the left side of the exemplary wireless device 400 within the holster 500.

Figure 8:
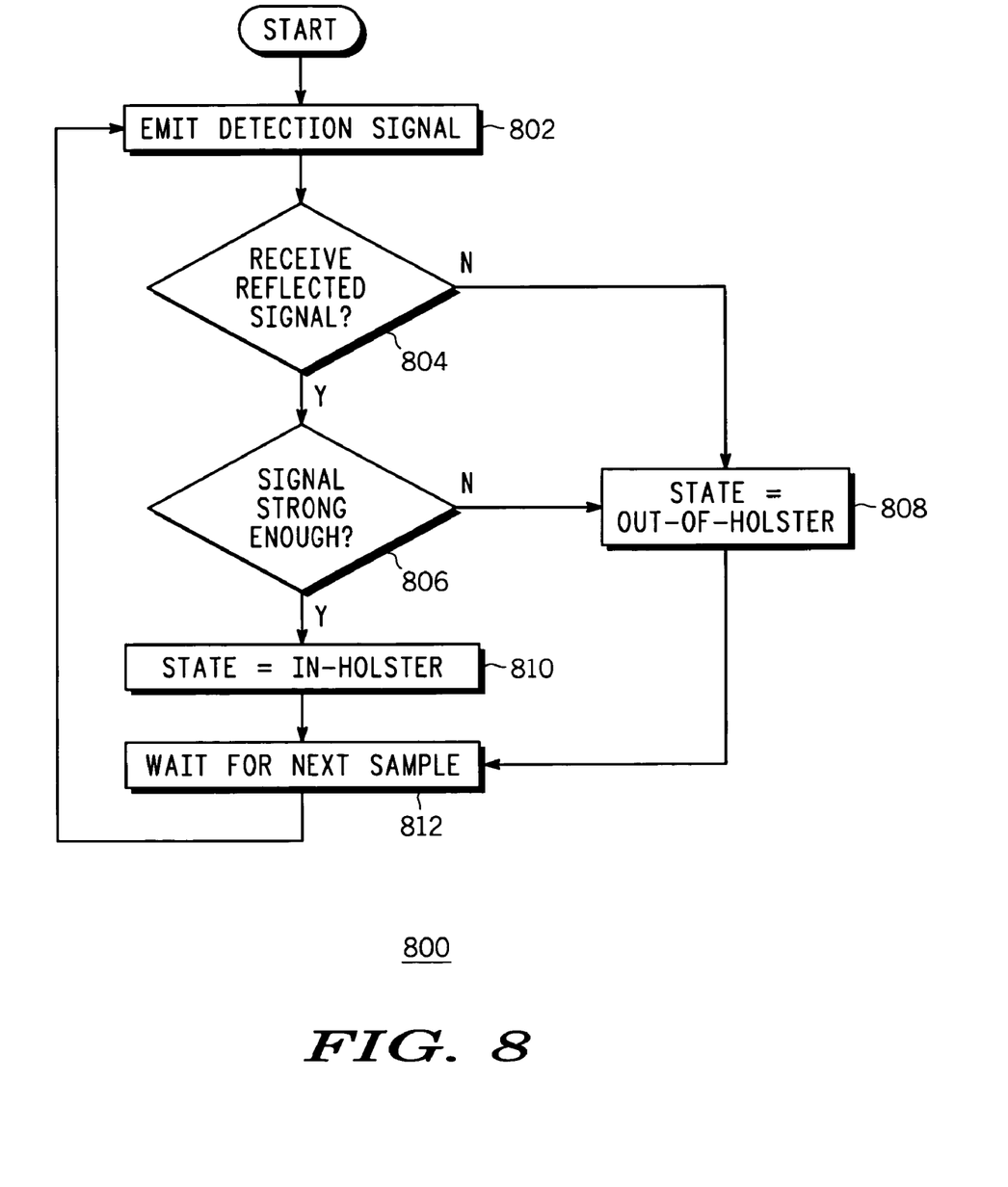
FIG. 8 is a nearby surface detection processing flow diagram according to an exemplary embodiment of the present invention.

FIG. 8 illustrates a surface detection processing flow diagram 800 as is performed by the exemplary wireless device 400. The surface detection processing flow 800 begins by emitting, at step 802, a detection signal from the exemplary wireless device 400. The detection signal in this exemplary embodiment consists of both a light signal emitted by the backlight for display 334 and keypad 338 as well as a non-audible frequency sound signal emitted by speaker 330. Emission of these detection signals is controlled by the processor 320. The processor 320 controls the backlight of display 334 and keypad 338, as well as the sound signal generated by speaker 330, so that these emitted signals have a detectable pulse pattern and amplitude envelope that facilitates detection by the processing described below.

The processing continues by determining, at step 804, if a reflected detection signal was received. This determination in the exemplary embodiment includes determining if the received detection signal, such as light received by camera 336 or non-audible frequency sound received by microphone 332, matches the pulse pattern and amplitude envelope of the corresponding generated detection signals. If it is determined that a reflected detection signal was received, the processing next determines, at step 806, if the received signal amplitude is sufficient (e.g., that it meets or exceeds a predetermined threshold) to assume that the detection signal was reflected by a nearby surface. This step includes determining the intensity of light detected by camera 336 and the sound level of non-audible frequency sound received by microphone 332. If the received detection signal is determined to have been strong enough, the processing continues, at step 810, to set the state of the wireless device to "in holster." If the processing determines, at step 804, that no reflected determination signal was received or if the processing determines, at step 806, that the signal was not strong enough, the processing sets the state of the wireless device to "out of holster." Note that an alternative embodiment of the present invention the processing of steps 804 and 806 may be interchanged. That is, at step 804 the processing determines whether the received signal amplitude is sufficient (e.g., that it meets or exceeds a predetermined threshold) to assume that the detection signal was reflected by a nearby surface, and at step 806 the processing determines if the received detection signal, such as light received by the camera 336 or non-audible frequency sound received by the microphone 332, matches a predefined pulse pattern and amplitude envelope of the corresponding generated detection signals. Other combinations of determining detection signals should be obvious to those of ordinary skill in the art in view of the present discussion. For example, a particular implementation may use a first light intensity to determine whether the state is in-holster, and then use the non-audible frequency sound received by the microphone 332 as a secondary (backup) determination of "in-holster". Alternatively, a process may use the non-audible frequency sound first to determine whether "in-holster" and then if necessary use the light intensity as a secondary confirmation of "in-holster". These sequential alternatives may increase reliability of detection while utilizing less power-consumption from the detection signal generation and receiving circuits over repeating cycles of detection signal generation and detection signal reception. This type of processing in certain implementations may help significantly increase the life of a battery or other depleting power source.

Continuing on with the example processing shown in FIG. 8, after either step 810 (determination of "in-holster") or step 808 (determination of "out-of-holster), the processing of the exemplary embodiment advances to wait, at step 812, for a period between sensing the presence of a nearby surface. This period is between one and two seconds in the exemplary embodiment and further embodiments are able to use any period to provide a suitable detection period.

The operation of the exemplary wireless device 400 for detecting nearby surfaces through the use of non-audible frequency sound signals has an added advantage that any surface that is nearby the front of the exemplary wireless device 400 is detected. This allows not only detection of proximity of a holster 500, but also allows detection of placement of the exemplary wireless device 400 into any carrying case, woman's purse, person's pocket, or face down placement on a desk or other surface. This allows further battery savings by changing the configuration settings, as described below, under these conditions in addition to placement in a holster 500.

Based upon the state of the device as being "in-holster" or "out of holster," the processor 320 of the exemplary embodiment is able to be configured to alter at least one operational mode of the exemplary wireless device 400. Such operational modes are generally altered to reduce power consumption and prolong battery life. Operational modes can also be changed to achieve other ends, such as to provide different ring signals or effects based upon the state of the exemplary wireless device 400.

III. Configuration of Settings

Figure 9:
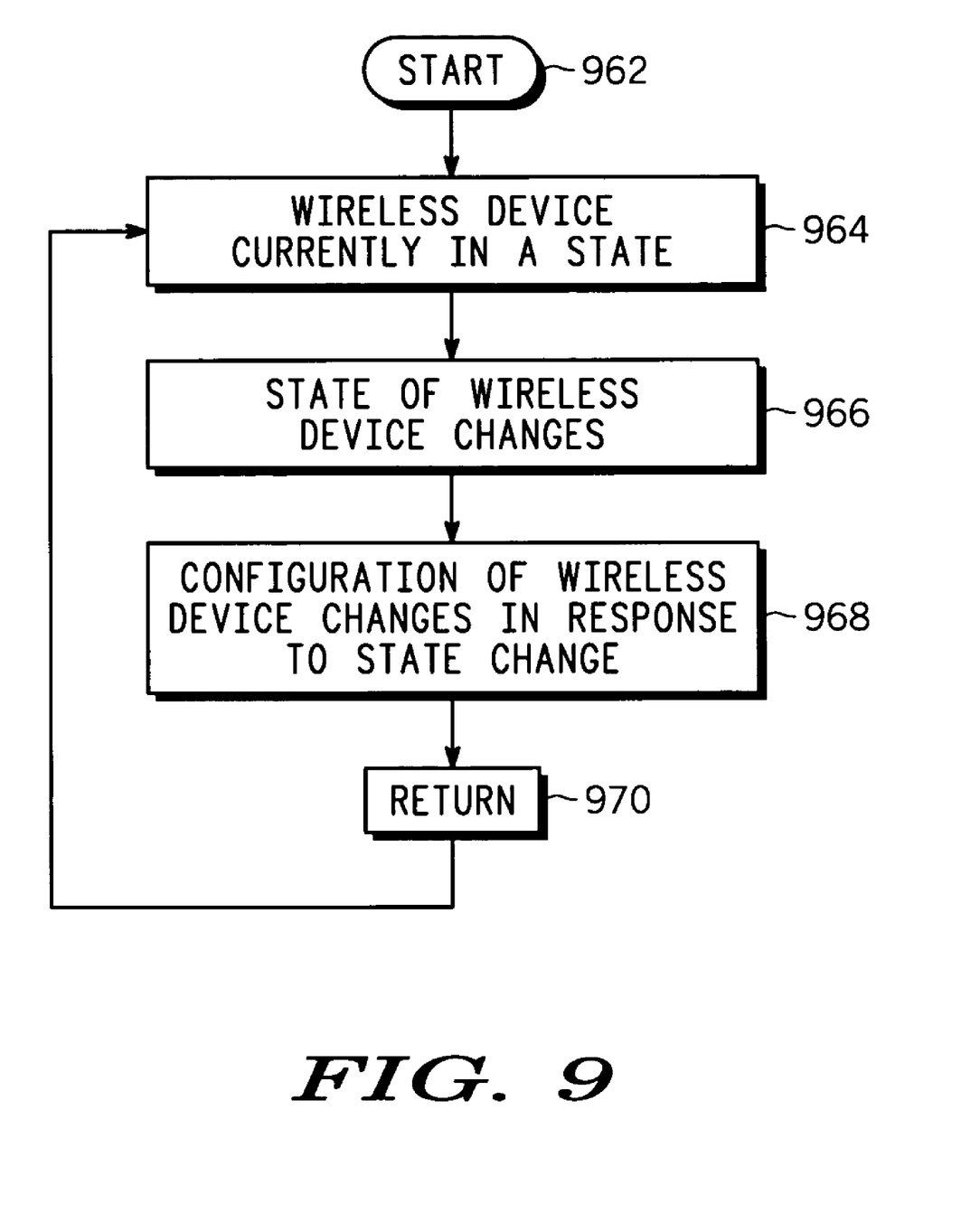
FIG. 9 is an operational flow diagram showing a configuration setting process of a wireless device according to an embodiment of the present invention.

As described above, the exemplary embodiment of the present invention can be configured to change operational modes, which includes changing configuration settings of the wireless device 106, based on the state of the wireless device 106. FIG. 9 is an operational flow diagram showing a configuration setting process of a wireless device according to a preferred embodiment of the present invention. The operational flow diagram of FIG. 9 depicts the process, on a wireless device 106, of adjusting the configuration settings of wireless device 106 based on the state of the wireless device 106.

Configuration settings include a variety of settings associated with the functions of the wireless device 106. One example of a setting of the wireless device 106 is the ring setting which is the configured action that the wireless device 106 performs, as selected from a variety of available actions, when an incoming call is detected. The wireless device 106 can be configured such that the wireless device 106 plays a ring, a series of rings, a beep, a series of beeps or any audio file (such as WAV file or an MP3 file) when an incoming call is detected. The wireless device 106 can also be configured such that the wireless device 106 vibrates when an incoming call is detected.

Another example of a configuration setting of the wireless device 106 is the battery setting. The wireless device 106 can be configured such that the wireless device 106 operates in different battery modes, such as normal battery mode and battery save mode, in different situations. In battery save mode, the configuration settings for the wireless device 106 are configured such that the wireless device 106 performs battery save tasks such as turning off the backlight of the view screen of the wireless device 106 during normal operations or powering down certain electrical components of the wireless device 106. In normal battery mode, the wireless device 106 is configured such that the wireless device 106 operates normally without attempting to save battery power. Although the backlight is turned off for normal operations in battery save mode, processor 320 is still able to activate the backlight in order to perform nearby surface detection, as described herein.

Another example of a setting of the wireless device 106 is the keypad 338 setting. The wireless device 106 can be configured such that the keypad 338 of the wireless device 106 is either enabled or disabled. When the keypad 338 of the wireless device 106 is enabled, the wireless device 106 is configured such that information can be entered into the wireless device 106 via the keypad 338. When the keypad 338 of the wireless device 106 is disabled, the wireless device 106 is configured such that information can no longer be entered into the wireless device 106 via the keypad 338.

Another example of a setting of the wireless device 106 is the device use setting. The wireless device 106 can be configured such that use of the wireless device 106 is either enabled or disabled. Typically, the use of the wireless device 106 is disabled only after the wireless device 106 has been idle for a set period of time. When the use of the wireless device 106 is enabled, the wireless device 106 is configured such that the wireless device 106 can be used normally. When the use of the wireless device 106 is disabled or locked, the wireless device 106 is configured such that the wireless device 106 cannot be used for any function.

In an embodiment of the present invention, the operational flow diagram of FIG. 9 depicts the process, on a wireless device 106, of configuring settings of wireless device 106 based on the placement (or non-placement of) of the wireless device 106 within a holster, such as holster 500. FIG. 9 is described below with reference to the above embodiment. The operational flow diagram of FIG. 9 begins with step 962 and flows directly to step 964.

In step 964, the wireless device 106 is currently in a state, such as the in-holster state and the out-of-holster state. In step 966, the state of the wireless device 106 changes. That is, the wireless device 106 is either removed from the holster 500 or inserted into the holster 500. In step 968, the configuration settings of the wireless device 106 are adjusted in response to the change in state of step 966. Settings include a variety of settings associated with the functions of the wireless device 106. Settings are described in greater detail above.

In an embodiment of the present invention, in step 968, a group of settings are adjusted to a first sequence if the wireless device 106 is placed in the holster 500 in step 966. The following section describes the first sequence of settings.

First, the ring setting of the wireless device 106 is set to vibrate if the wireless device 106 is not externally powered. That is, the wireless device 106 does not ring when an incoming telephone call is detected. Rather, the wireless device 106 vibrates to notify the user that an incoming call is detected. This setting is only adjusted if the wireless device 106 is not externally powered, i.e., when the wireless device 106 is not connected to a charger or other device for providing an electrical current to the wireless device 106.

Second, the battery setting of the wireless device 106 is set to battery save mode. This setting enables the wireless device 106 to perform battery save tasks such as turning off the backlight of the display 334 and keypad 338 of the wireless device 106 during normal operations or powering down certain electrical components of the wireless device 106. Third, the keypad 338 of the wireless device 106 is locked or disabled. This setting disables the keypad 338 such that information can no longer be entered into the keypad 338. Fourth, the device use setting of the wireless device 106 is enabled. That is, the wireless device 106 is currently able to be utilized by the user in a normal fashion.

In an embodiment of the present invention, in step 968, a group of settings are adjusted to a second sequence if the wireless device 106 is removed from the holster 500 in step 966. The following section describes the second sequence of settings.

First, the ring setting of the wireless device 106 is set to ring. That is, the wireless device 106 rings when an incoming telephone call is detected. Second, the battery setting of the wireless device 106 is set to normal mode. This setting allows the wireless device 106 to perform tasks normally without having to perform battery save tasks such as turning off the backlight of the view screen of the wireless device 106 or powering down certain electrical components of the wireless device 106.

Third, the keypad 338 of the wireless device 106 is unlocked or enabled. This setting enables the keypad 338 such that information can be entered into the keypad 338. Fourth, the device use setting of the wireless device 106 is set to be disabled after a time period. That is, after the wireless device 106 has been removed from the holster 500 for a set period of time, the wireless device 106 is disabled such that it can no longer be used for any functions. The wireless device 106 can be removed from the disabled device use setting if the user inserts the wireless device 106 into the holster 500 or inputs a code or password into the keypad 338 of the wireless device 106.

In step 970, the control of FIG. 9 returns to step 964.

The configuration of the ring setting is beneficial when the wireless device 106 is in the holster 500 because it allows a user to avoid loud and/or disruptive ringing. When the wireless device 106 is in the holster 500, there is no need for the device to ring due to the proximity of the wireless device 106 to the user. Thus, the vibration of the wireless device 106 notifies the user of an incoming call.

The configuration of the ring setting is also advantageous because it eliminates the repeated adjustment of the ring setting by a user when he enters into situation when a ring is not appropriate, such as in a movie theater or a place of worship. The configuration of the ring setting is further advantageous because it reduces the number of missed calls due to the removal of a wireless device 106 from a user's person when the wireless device 106 is set to vibrate. Users often miss calls when the wireless device 106 is not attached to a user and the wireless device 106 is set to vibrate. The present invention configures the wireless device 106 to ring when it is removed from the holster 500, thereby allowing the user to hear the wireless device 106 when it receives an incoming call.

The configuration of the battery setting is beneficial when the wireless device 106 is in the holster 500 because it saves battery life and allows for longer use of the wireless device 106 between charges. When the wireless device 106 is in the holster 500, there is no need for certain tasks or operations to continue, such as the backlight of the view screen of the wireless device 106. The present invention configures the battery setting of the wireless device 106 to battery save mode when it is inserted into the holster 500, thereby saving battery life.

The configuration of the keypad 338 setting is beneficial when the wireless device 106 is in the holster 500 because it eliminates the accidental entry of information via the keypad 338 when the wireless device 106 is not in use. When the wireless device 106 is in the holster 500, there is no need for allowing the input of information into the wireless device 106 via the keypad 338. The present invention configures the keypad 338 setting of the wireless device 106 to be disabled when it is inserted into the holster 500, thereby preventing accidental entry of information. As an option, the device 106 can turn off the entire display 334 to conserve power.

The configuration of the device use setting is beneficial when the wireless device 106 has been removed from the holster 500 for a set period of time because it prevents the unauthorized use of the wireless device 106 by others. When the wireless device 106 has been removed from the holster 500 for a set period of time without use, the present invention configures the device use setting of the wireless device 106 to be disabled. This security feature prevents the unauthorized use of the wireless device 106 when it has been removed from the holster 500 and is not in the possession of the user.

IV. Exemplary Implementations

The present invention can be realized in hardware, software, or a combination of hardware and software in wireless device 106 of FIG. 1. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product (in wireless device 106), which comprises all the features enabling the implementation of the methods described herein, and which, when loaded in a computer system, is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer-readable medium, allowing a computer system, to read data, instructions, messages or message packets, and other computer-readable information from the computer-readable medium. The computer-readable medium may include non-volatile memory, such as ROM, Flash memory, Disk drive memory, CD-ROM, and other permanent storage. Additionally, a computer-readable medium may include, for example, volatile storage such as RAM, buffers, cache memory, and network circuits. Furthermore, the computer-readable medium may comprise computer-readable information in a transitory state medium such as a network link and/or a network interface, including a wired network or a wireless network, that allow a computer system to read such computer-readable information.

Figure 10:
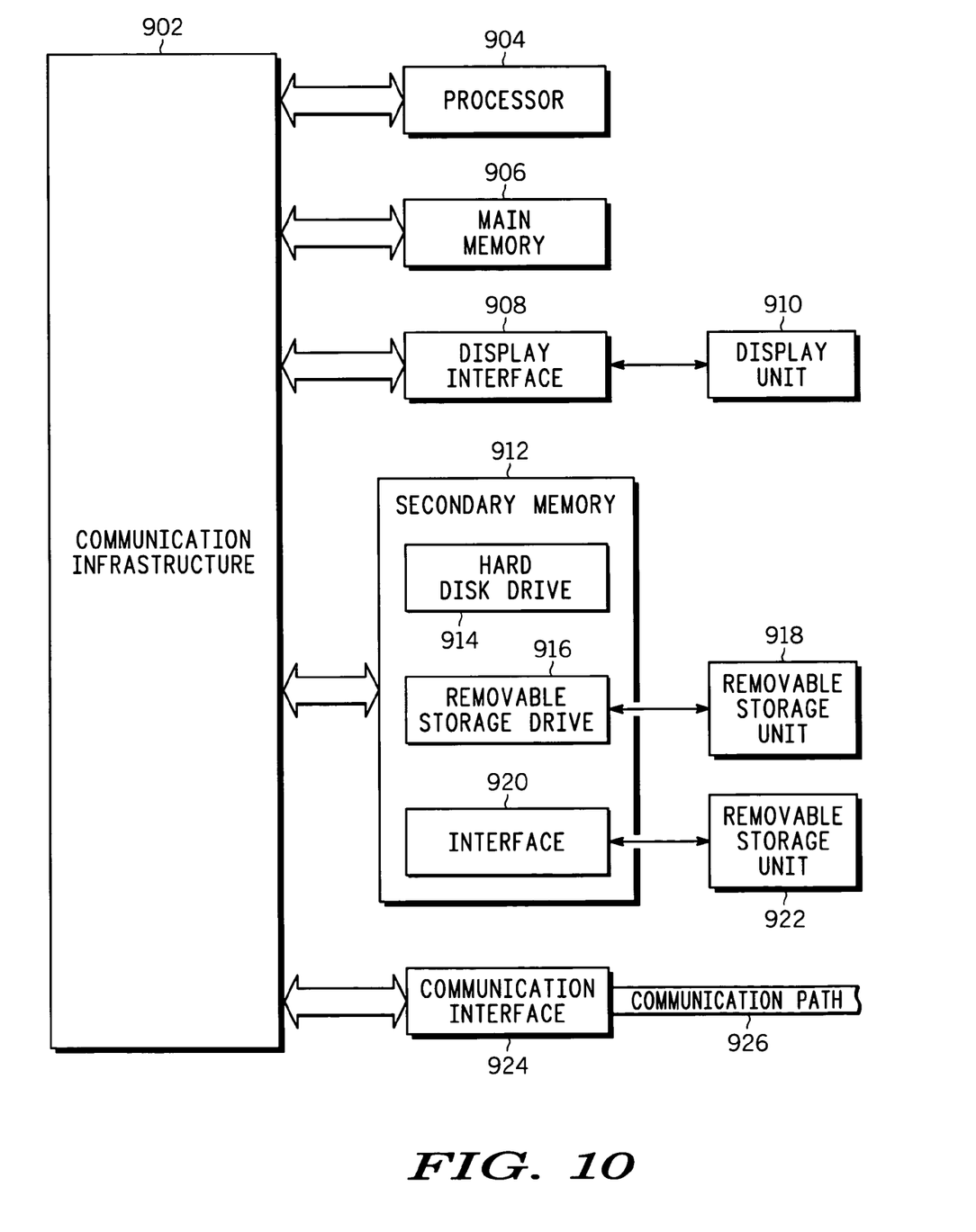
FIG. 10 is a block diagram of an information processing system useful for implementing an embodiment of the present invention.

FIG. 10 is a block diagram of a computer system useful for implementing an embodiment of the present invention. The computer system of FIG. 10 is a more detailed representation of one facet of a wireless device 106. The computer system of FIG. 10 includes one or more processors, such as processor 904. The processor 904 is connected to a communication infrastructure 902 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 908 that forwards graphics, text, and other data from the communication infrastructure 902 (or from a frame buffer not shown) for display on the display unit 910. The computer system also includes a main memory 906, preferably random access memory (RAM), and may also include a secondary memory 912. The secondary memory 912 may include, for example, a hard disk drive 914 and/or a removable storage drive 916, representing a floppy disk drive, a magnetic tape drive, an optical disk drive, etc. The removable storage drive 916 reads from and/or writes to a removable storage unit 918 in a manner well known to those having ordinary skill in the art. Removable storage unit 918, represents a floppy disk, magnetic tape, optical disk, etc., which is read by and written to by removable storage drive 916. As will be appreciated, the removable storage unit 918 includes a computer usable storage medium having stored therein computer software and/or data.

In alternative embodiments, the secondary memory 912 may include other similar means for allowing computer programs or other instructions to be loaded into the computer system. Such means may include, for example, a removable storage unit 922 and an interface 920. Examples of such may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to the computer system.

The computer system may also include a communications interface 924. Communications interface 924 allows software and data to be transferred between the computer system and external devices. Examples of communications interface 924 may include a modem, a network interface (such as an Ethernet card), a communications port, a PCMCIA slot and card, etc. Software and data transferred via communications interface 924 are in the form of signals which may be, for example, electronic, electromagnetic, optical, or other signals capable of being received by communications interface 924. These signals are provided to communications interface 924 via a communications path (i.e., channel) 926. This channel 926 carries signals and may be implemented using wire or cable, fiber optics, a phone line, a cellular phone link, an RF link, and/or other communications channels.

In this document, the terms "computer program medium," "computer-usable medium," "machine-readable medium" and "computer-readable medium" are used to generally refer to media such as main memory 906 and secondary memory 912, removable storage drive 916, and a hard disk installed in hard disk drive 914. These computer program products are means for providing software to the computer system. The computer-readable medium allows the computer system to read data, instructions, messages or message packets, and other computer-readable information from the computer-readable medium. The computer-readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer-readable medium may comprise computer-readable information in a transitory state medium such as a network link and/or a network interface, including a wired network or a wireless network, that allow a computer to read such computer-readable information.

Computer programs (also called computer control logic) are stored in main memory 906 and/or secondary memory 912. Computer programs may also be received via communications interface 924. Such computer programs, when executed, enable the computer system to perform the features of the present invention as discussed herein. In particular, the computer programs, when executed, enable the processor 904 to perform the features of the computer system. Accordingly, such computer programs represent controllers of the computer system.

V. Conclusion

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A wireless device arrangement, comprising:
   a detection signal generator generating a detection signal to be emitted from a wireless device;
   a detection signal receiver, located on the wireless device and oriented to
      receive the detection signal if the detection signal is reflected from a nearby surface of a carrying device that is supporting the wireless device arrangement, and
      not receive the detection signal if the detection signal is not reflected from the nearby surface of the carrying device; and
   a device controller, communicatively coupled to the detection signal receiver, the device controller determining reception of the detection signal and altering at least one operational mode of the wireless device in response to receiving the detection signal reflected from the nearby surface.

2. The wireless device arrangement of claim 1, wherein the detection signal generator generates the detection signal with at least one of a pulse pattern and an amplitude envelope, and the device controller determines reception of the detection signal by, at least in part,
   determining if an intensity of the received detection signal exceeds a pre-determined threshold,
   identifying the pulse pattern, and
   identifying the amplitude envelope.

3. The wireless device arrangement of claim 1, wherein the carrying device is a holster configured to accept attachment to the wireless device and to reflect the detection signal when attached to the wireless device.

4. The wireless device arrangement of claim 1, wherein the detection signal comprises a non-audible frequency sound signal, the detection signal generator comprises a non-audible frequency sound signal generator, and the detection signal receiver comprises a non-audible frequency sound receiver.

5. The wireless device arrangement of claim 4, wherein the non-audible frequency sound signal generator comprises a speaker.

6. The wireless device arrangement of claim 4, wherein the non-audible frequency sound signal receiver comprises a microphone.

7. The wireless device arrangement of claim 4, wherein the at least one operational mode comprises at least one of keypad backlighting intensity, display backlighting intensity, ring setting, battery setting, and device use setting.

8. The wireless device arrangement of claim 1, wherein the detection signal comprises a light signal, the detection signal generator comprises a light generator and the detection signal receiver comprises a light receiver.

9. The wireless device arrangement of claim 8, wherein the light generator comprises at least one of a display backlight and a keypad backlight.

10. The wireless device arrangement of claim 8, wherein the light receiver comprises a camera.

11. The wireless device arrangement of claim 8, wherein the Carrying device is a holster, the holster comprising a reflective strip positioned to reflect the light signal when in proximity to the wireless device.

12. The wireless device arrangement of claim 8, wherein the at least one operational mode comprises at least one of keypad backlighting intensity, display backlighting intensity, ring setting, battery setting, and device use setting.

13. A method for automatically configuring settings of a wireless device, comprising:

emitting a detection signal from a wireless device;

detecting reception of the detection signal with a detection signal receiver that is located on the wireless device and oriented to         receive the detection signal if the detection signal is reflected from a nearby surface of a carrying device that is supporting the wireless device arrangement, and         not receive the detection signal if the detection signal is not reflected from the nearby surface of the carrying device; and     altering at least one operational mode of the wireless device in response to receiving the detection signal being reflected from the nearby surface.

14. The method of claim 13, wherein the emitting comprises emitting the detection signal with a pulse pattern or an amplitude envelope, and the detecting reception comprises identifying the at least one pulse pattern and amplitude envelope.

15. The method of claim 13, wherein the detection signal comprises a non-audible frequency sound signal, emitting a detection signal comprises emitting a non-audible frequency sound signal, and the detecting reception comprises detecting a non-audible frequency sound signal.

16. The method of claim 15, wherein emitting the non-audible frequency sound signal comprises a speaker generating the non-audible frequency sound signal.

17. The method of claim 15, wherein detecting the non-audible frequency sound signal comprises a microphone receiving the non-audible frequency sound signal.

18. The method of claim 13, wherein the detection signal is a light signal, the emitting a detection signal comprises generating a light signal and the detecting reception comprises receiving the light signal.

19. The method of claim 18, wherein generating the light signal comprises generating the light signal by at least one of a display backlight and a keypad backlight.

20. The method of claim 18, wherein detecting the light signal comprises a camera receiving the light signal.

21. A computer readable medium including computer instructions for automatically configuring settings of a wireless device, the computer instructions including instructions for:

emitting a detection signal from a wireless device;

detecting reception of the detection signal with a detection signal receiver that is located on the wireless device and oriented to         receive the detection signal if the detection signal is reflected from a nearby surface of a carrying device that is supporting the wireless device arrangement, and         not receive the detection signal if the detection signal is not reflected from the nearby surface of the carrying device; and     altering at least one operational mode of the wireless device in response to receiving the detection signal being reflected from a nearby surface.

\* \* \* \* \*